H. J. LOZIER.
PAPER RECEPTACLE.
APPLICATION FILED SEPT. 24, 1919.
1,358,008. Patented Nov. 9, 1920.
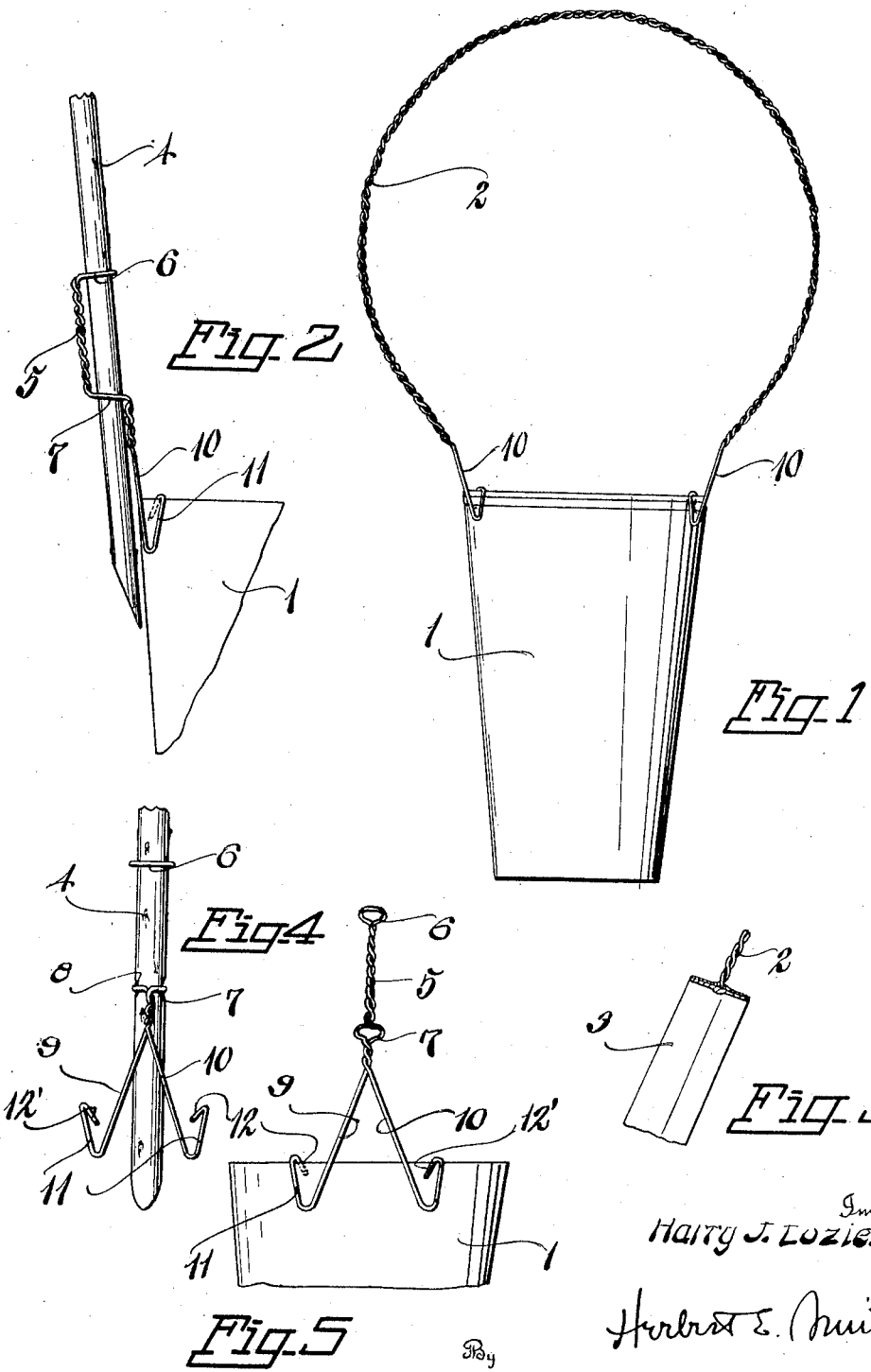

UNITED STATES PATENT OFFICE.

HARRY J. LOZIER, OF SPOKANE, WASHINGTON.

PAPER RECEPTACLE.

1,358,008. Specification of Letters Patent. Patented Nov. 9, 1920.

Application filed September 24, 1919. Serial No. 326,063.

*To all whom it may concern:*

Be it known that I, HARRY J. LOZIER, a citizen of the United States, residing at Spokane, in the county of Spokane and State of Washington, have invented certain new and useful Improvements in Paper Receptacles, of which the following is a specification.

The present invention relates to improvements in paper receptacles and is designed particularly for use by florists and others, for making up bouquets of cut flowers.

The primary object of the invention is the provision of a durable, comparatively inexpensive, and attractive looking basket or receptacle for flowers, and this object is accomplished by the combination and arrangement of parts involving especially the handle and its attachment to the receptacle, as hereinafter set forth and claimed.

In the accompanying drawings, I have illustrated one complete example, and a modified form thereof, showing the physical embodiment of the invention, the parts being combined and arranged according to the best mode I have so far devised for the practical application of the principles of the invention.

Figure 1 is a view in side elevation of a flower basket or receptacle embodying the invention.

Fig. 2 is an enlarged detail view showing one of the handle ends attached to the receptacle and employing a separate reed or bail instead of the integral bail as in Fig. 1.

Fig. 3 is a detail view showing a fragment of the wire bail with a paper cover thereon.

Fig. 4 is a detail view showing the reed bail fastener to secure the reed bail to the receptacle.

Fig. 5 is a detail view showing the reed bail fastener with the bail omitted, in its operative relationship to the receptacle.

The receptacle 1 is made of waxed paper or compressed paper or of goods of similar material, and may be made up into suitable sizes and shapes for the purpose intended, and in connection with the receptacle I utilize, as in Fig. 1, the twisted wire bail or handle 2, which in some instances, may be covered with a paper covering or ribbon 3 of various colors or shades conforming to the color scheme of the flowers in the basket. This ribbon or covering adds to the appearance of the receptacle, and lends a substantial aspect to the handle, although in itself, the covering is light and inexpensive.

In some instances a bail made of light material, such as a reed, as 4 is employed, and under these conditions the wire is twisted to form a brace or bracket arm 5 and fashioned with the upper loop 6 and lower loop 7, the latter "pinched" as at 8 in Fig. 4, to frictionally hold the reed bail. Both loops encircle the reed near its end and provide a secure and stable fastening for connecting the bail with the receptacle, it being understood, of course, that both ends of the bail have one of these fastening devices to secure it to the receptacle.

To fasten the bail, in both forms of bail shown, to the receptacle, I employ the same diverging braces or arms 9 and 10 which spread from the body of the twisted wire and near their terminals are formed with return bends 11 extending upward, and the extremities of the terminal bends are designed to loop over as at 12, in order that they may extend over the edge of the receptacle, and then from inside the receptacle pass through the material thereof to the outside and be flattened down as by hammer blows or machinery. These two ends or loops indicated as 12 and 12' for fastening the respective ends of the bail to the receptacle, as best seen in Fig. 5 are spaced apart in order to bring a wide base for the attachment of the bail to the receptacle and to prevent weakening the material of the receptacle, which would undoubtedly occur, if the two fastening loops were brought too near together.

The bail may be attached to the receptacle either at the place of manufacture, or at the place of use, as by the florist, but in either event the attaching arms or braces are slipped over the edge of the basket, and the point or end of the wire is squeezed through the material of the basket to securely hold the bail and basket together, and the bail, in either form is usually gilded or silvered to give it an attractive appearance.

What I claim is—

1. The combination with a basket and bail as described, of straight diverging brace arms at the ends of the bail extending downwardly below the upper edge and outside the basket, each said arm having an upwardly and outwardly bent portion and lying in the same plane with said arm against the outer surface of the basket, and each arm terminating in a loop over the edge and passing through the material of the basket from the inner side to the outside thereof.

2. The combination with a basket and reed bail, of bent wire fastening devices at the ends of the bail fashioned with securing loops on the bail and each said device having straight diverging brace arms extending downwardly, outside and below the upper edge of the basket, each said arm having an upwardly and outwardly bent portion and lying in the same plane with said arm and against the outer surface of the basket, and each arm terminating in a loop over the edge and passing through the material of the basket from the inner side to the outside thereof.

In testimony whereof I affix my signature.

HARRY J. LOZIER.